UNITED STATES PATENT OFFICE.

EDWIN SCHAFFER, OF FRANKFORD, PENNSYLVANIA.

FLOWER-BOX.

No. 905,238.	Specification of Letters Patent.	Patented Dec. 1, 1908.

Application filed March 13, 1908. Serial No. 420,980.

*To all whom it may concern:*

Be it known that I, EDWIN SCHAFFER, a citizen of the United States, residing at Frankford, in the county of Philadephia and State of Pennsylvania, have invented a certain new and useful Flower-Box, of which the following is a specification.

The principal object of the present invention is to provide a box or receptacle for the earth or soil in which plants are growing which box or receptacle is adapted for indoor use in that it prevents surplus water applied to the earth from leaking or running from the box or receptacle, and at the same time affords means whereby said surplus water may be retained and conveniently applied to the soil.

Figure 1:
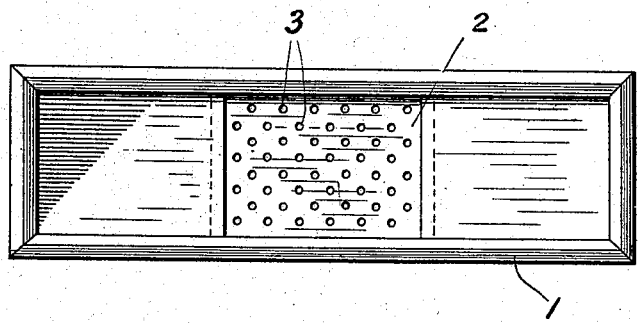
Figure 2:
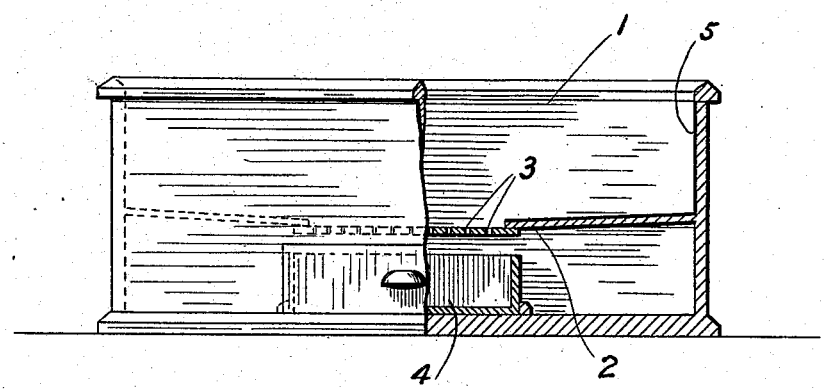
Figure 3:
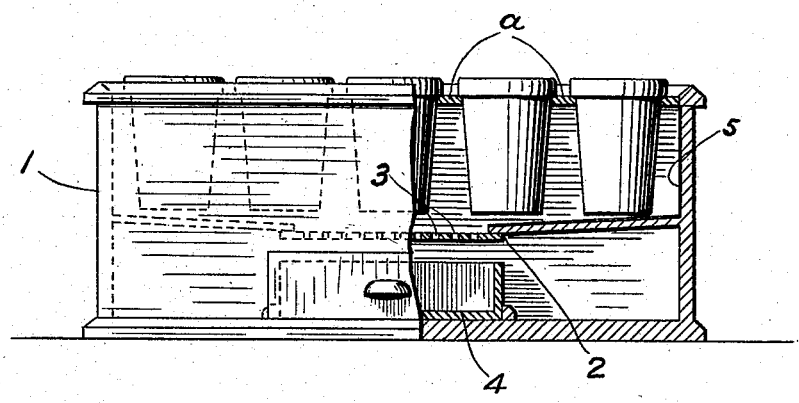

The invention will be claimed at the end hereof, but will first be described in connection with the accompanying drawings which illustrate one, but not the only embodiment of the invention, and in which Figure 1, is a plan view. Fig. 2, is a front elevational view partly in section, and Fig. 3, is an elevational view partly in section, showing a modification of the invention.

In the drawings 1, is the flower box and it may be made of any appropriate or suitable material as wood, porcelain, glass, clay, metal, or a combination of these. Within the box, there is a partition 2, having drain openings 3, and above this partition is the space for the reception of the soil. Below this partition is a space for the reception of a drip pan 4, which is detachable from the box, and which as shown is of drawer form.

In the drawings, the box proper is shown as constructed of wood and provided with a lining 5, as of copper or other suitable material. The drip pan is shown as made of metal, or other appropriate material.

In use any excess of water in the earth or soil above the partition finds its way through the drain openings into the receptacle 4, which retains it and prevents it from escaping. Whenever it is necessary or desirable, the receptacle 4 containing this water may be withdrawn and the water poured from it on the plants or soil in which they are growing.

While I have stated that the soil or earth is placed in the receptacle 2, I contemplate, if desired, placing the pots in which the flowers are growing, above the drain openings and if desired there may be employed a lid or cover *a*, having circular holes for the reception of the pots, the rim being shown in Fig. 3.

What I claim as new, is

A flower receptacle comprising a box having its bottom flat on the outside to constitute a flat base and having a partition provided with a perforated center portion towards which its side portions are inclined and which is arranged above the floor to provide an air space beneath and flower space above, and the box having beneath the partition and in its side wall an opening for a drip receptacle through which opening excess water must escape, thereby maintaining a supply of air beneath the partition, and a drip receptacle detachably arranged in said opening beneath the perforated portion of the partition and having space between its top and the bottom of the partition, substantially as described.

In testimony whereof I have hereunto signed my name in the presence of witnesses.

EDWIN SCHAFFER.

Witnesses:
CLIFFORD K. CASSEL,
FRANK E. FRENCH.